(12) United States Patent
Othmezouri et al.

(10) Patent No.: US 9,569,694 B2
(45) Date of Patent: Feb. 14, 2017

(54) DETECTION OF OBJECTS IN AN IMAGE USING SELF SIMILARITIES

(71) Applicants: TOYOTA MOTOR EUROPE NV/SA, Brussels (BE); TECHNISCHE UNIVERSITAT DARMSTADT, Darmstadt (DE)

(72) Inventors: Gabriel Othmezouri, Brussels (BE); Ichiro Sakata, Brussels (BE); Bernt Schiele, Darmstadt (DE); Stefan Walk, Darmstadt (DE); Nikodem Majer, Reinheim (DE); Konrad Schindler, Darmstadt (DE)

(73) Assignees: TOYOTA MOTOR EUROPE NV/SA, Brussels (BE); TECHNISCHE UNIVERSITAT DARMSTADT, Darmstadt (DE)

( * ) Notice: Subject to any disclaimer, the term of this patent is extended or adjusted under 35 U.S.C. 154(b) by 0 days.

(21) Appl. No.: 14/989,504

(22) Filed: Jan. 6, 2016

(65) Prior Publication Data
US 2016/0117571 A1 Apr. 28, 2016

Related U.S. Application Data

(63) Continuation of application No. 13/697,212, filed as application No. PCT/EP2011/052944 on Feb. 28, 2011, now abandoned.

(30) Foreign Application Priority Data

Jun. 11, 2010 (EP) .................................... 10165769

(51) Int. Cl.
*G06K 9/00* (2006.01)
*G06K 9/62* (2006.01)
(Continued)

(52) U.S. Cl.
CPC ......... *G06K 9/6215* (2013.01); *G06K 9/00369* (2013.01); *G06K 9/4642* (2013.01);
(Continued)

(58) Field of Classification Search
None
See application file for complete search history.

(56) References Cited

U.S. PATENT DOCUMENTS 6,373,979 B1 4/2002 Wang
8,615,108 B1 12/2013 Stoppa et al.
(Continued)

OTHER PUBLICATIONS

Stefan Walk, et al, "New Features and Insights for Pedestrian Detection", IEEE Computer Vision and Pattern Recognition, Apr. 4, 2010, pp. 1030-1037.
(Continued)

*Primary Examiner* — Vu Le
*Assistant Examiner* — Samah Beg
(74) *Attorney, Agent, or Firm* — Sughrue Mion, PLLC

(57) ABSTRACT

An image processor (10) has a window selector for choosing a detection window within the image, and a self similarity computation part (40) for determining self-similarity information for a group of the pixels in any part of the detection window, to represent an amount of self-similarity of that group to other groups in any other part of the detector window, and for repeating the determination for groups in all parts of the detection window, to generate a global self similarity descriptor for the detection window. A classifier (50) is used for classifying whether an object is present based on the global self-similarity descriptor. By using global self-similarity rather than local similarities more information is captured which can lead to better classifica- (Continued)

tion. In particular, it helps enable recognition of more distant self-similarities inherent in the object, and self-similarities present at any scale.

11 Claims, 7 Drawing Sheets

(51) Int. Cl.
*G06K 9/46* (2006.01)
*G06K 9/52* (2006.01)
*G06T 7/40* (2006.01)
*G06T 7/60* (2006.01)

(52) U.S. Cl.
CPC ......... *G06K 9/4647* (2013.01); *G06K 9/4652* (2013.01); *G06K 9/52* (2013.01); *G06K 9/6267* (2013.01); *G06T 7/408* (2013.01); *G06T 7/60* (2013.01); *G06K 2009/4666* (2013.01); *G06T 2207/20021* (2013.01)

(56) References Cited

U.S. PATENT DOCUMENTS

| | | |
|---|---|---|
| 2006/0029253 A1 | 2/2006 | Pace |
| 2006/0228006 A1 | 10/2006 | Matsumoto et al. |
| 2009/0202147 A1* | 8/2009 | Sambongi ........... G06F 17/3025 382/165 |
| 2009/0208110 A1 | 8/2009 | Hoppe et al. |
| 2010/0104158 A1 | 4/2010 | Shechtman et al. |
| 2010/0104203 A1 | 4/2010 | Garakani et al. |
| 2010/0188580 A1 | 7/2010 | Paschalakis et al. |
| 2010/0191722 A1 | 7/2010 | Boiman et al. |
| 2010/0266212 A1 | 10/2010 | Maurer et al. |
| 2011/0044536 A1* | 2/2011 | Cobb ...................... G06K 9/46 382/165 |
| 2011/0075935 A1 | 3/2011 | Baqai et al. |
| 2012/0207396 A1 | 8/2012 | Dong et al. |
| 2012/0281923 A1 | 11/2012 | Irani et al. |
| 2013/0129143 A1 | 5/2013 | Chen et al. |
| 2013/0156348 A1 | 6/2013 | Irani et al. |
| 2014/0270489 A1 | 9/2014 | Lim et al. |
| 2015/0003723 A1* | 1/2015 | Huang ................ G06K 9/6212 382/154 |
| 2015/0110387 A1* | 4/2015 | Lienhart ........... G06F 17/30256 382/159 |
| 2015/0145862 A1* | 5/2015 | Liu ....................... G06T 11/001 345/423 |
| 2015/0185017 A1* | 7/2015 | Kreider .............. G06K 9/00664 382/165 |
| 2015/0279036 A1* | 10/2015 | Artan .................... G06T 7/0022 382/159 |
| 2015/0374306 A1* | 12/2015 | Gelbman .............. G06T 7/0012 600/476 |

OTHER PUBLICATIONS

Thomas Deselaers et al., "Global an dEfficient Self-Similarity for Object Classification and Detection", IEEE Computer Vision and Pattern Recognition, Apr. 1, 2010, pp. 1633-1640.
Takumi Kobayashi et al., "Image Feature Extraction Using Gradient Local Auto-Correlations", Computer Vision ECCV, (Lecture Notes in Computer Science), Oct. 12, 2008, pp. 346-358, vol. 5302, Springer Berlin Heidelberg, Berlin.
Tomoki Watanabe et al., "Co-occurrence Histograms of Oriented Gradients for Pedestrian Detection", Lecture Notes in Computer Science, Proceedings of the 3rd Pacific Rim Symposium on Advances in Image and Video Technology, Jan. 13, 2009, pp. 37-47, vol. 5414, Springer Berlin Heidelberg, Berlin.
William Robston Schwartz et al., "Human Detection Using Partial Least Squares Analysis", IEEE International Conference on Computer Vision, Sep. 27, 2009-Oct. 4, 2009, pp. 24-31.
Eli Shechtman et al., "Matching Local Self-Similarities across Images and Videos", Computer Vision and Pattern Recognition, CVPR, Jun. 1, 2007, pp. 1-8.
International Search Report of PCT/EP2011/052944 dated Apr. 14, 2011.
Dalai and Triggs. Histograms of Oriented Gradients for Human Detection. IEEE 2005, vol. 1, pp. 886-893.
Lee et al. "Evaluation of Image Similarity by Histogram Intersection", Color Research and Application, Aug. 2005, p. 265-274.
Stauffer, C. and Grimson, E. "Similarity templates for detection and recognition," 2001, IEEE, p. 221-228.
Zhu et al. "Theory of Keyblock-Based Image Retrieval," ACM Transactions on Information Systems, vol. 20, No. 2, Apr. 2002, pp. 224-257.

\* cited by examiner

DETECTION OF OBJECTS IN AN IMAGE USING SELF SIMILARITIES

CROSS REFERENCE TO RELATED APPLICATIONS

This application is a Continuation application of U.S. application Ser. No. 13/697,212 filed on Nov. 9, 2012, in the U.S. Patent and Trademark Office, which is a National Stage application of International Application No. PCT/EP2011/052944 filed Feb. 28, 2011, which claims priority from European Patent Application No. 10165769.0 filed Jun. 11, 2010, the contents which are incorporated herein by reference in their entireties.

FIELD OF THE INVENTION

This invention relates to apparatus and methods for image processing to detect objects such as humans, and to corresponding computer programs for carrying out such methods and to memory devices storing the computer programs and also to corresponding integrated circuits.

BACKGROUND OF THE INVENTION

Pedestrian detection has been a focus of recent research due to its importance for practical applications such as automotive safety [see refs 11, 8] and visual surveillance [23]. The most successful model to date for "normal" pedestrians, who are usually standing or walking upright, is still a monolithic global descriptor for the entire search window. With such a model, there are three main steps which can be varied to gain performance: feature extraction, classification, and non-maxima suppression. The most common features extracted from the raw image data are variants of the HOG framework, i.e. local histograms of gradients and (relative) optic flow [3, 4, 10, 24, 27], and different flavors of generalized Haar wavelets, e.g. [6, 23]. Competitive classifiers we know of employ statistical learning techniques to learn the mapping from features to scores (indicating the likelihood of a pedestrian being present)—usually either support vector machines [3, 13, 17, 19, 27] or some variant of boosting [23, 27, 28, 30].

The spectacular progress that has been made in detecting pedestrians (i.e. humans in an upright position) is maybe best illustrated by the increasing difficulty of datasets used for benchmarking. The first [16] and second [3] generation of pedestrian databases are essentially saturated, and have been replaced by new more challenging datasets [7, 27, 6]. These recent efforts to record data of realistic complexity have also shown that there is still a gap between what is possible with pedestrian detectors and what would be required for many applications: in [6] the detection rate of the best methods is still <60% for one false positive detection per image, even for fully visible people.

SUMMARY OF THE INVENTION

An object of the invention is to provide apparatus and methods for image processing to detect objects such as humans, and to corresponding computer programs for carrying out such methods and to corresponding integrated circuits. According to a first aspect, the invention provides: An image processor for detection of an object in an image or sequence of images, each image being formed of pixels, and the image processor comprising: a window selector for choosing a detection window within the image, a self similarity computation part for determining self-similarity information for a group of the pixels in any part of the detection window, to represent an amount of self-similarity of that group to other groups in any other part of the detector window, and for repeating the determination for groups in all parts of the detection window, to generate a global self similarity descriptor for the chosen detection window, and a classifier for classifying whether the object is present in the detection window of the image from the global self-similarity descriptor for that detection window.

By using global self-similarity rather than local similarities more information is captured which can lead to better classification. In particular, it helps enable recognition of more distant self-similarities inherent in the object, and self-similarities present at any scale. The classifier can then make use of or capture those self similarities which are most discriminant of the object. Embodiments of the invention can have any other features added, some such additional features are set out in dependent claims and described in more detail below.

Other aspects of the invention include corresponding methods, and computer programs. Any of the additional features can be combined together and combined with any of the aspects, or can be disclaimed. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the claims of the present invention.

BRIEF DESCRIPTION OF THE DRAWINGS

How the present invention may be put into effect will now be described by way of example with reference to the appended drawings, in which.

DETAILED DESCRIPTION

Figure 1:
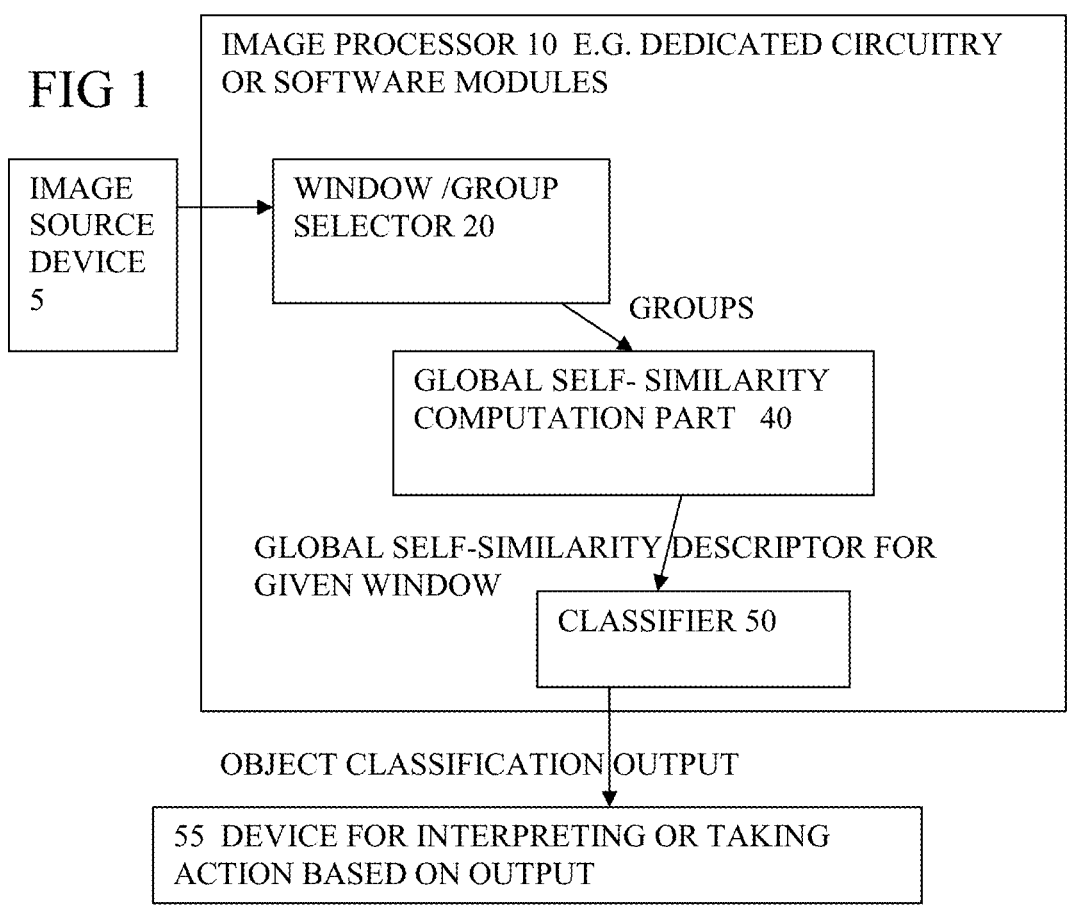
FIG. 1 shows an image processor according to a first embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments. Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention. References to a signal can encompass any kind of signal in any medium, and so can encompass an electrical or optical or wireless signal or other signal for example. References to analyzing can encompass processing a signal in any way to derive or enhance information about the material. References to a processor can encompass any means for processing signals or data in any form and so can encompass for example a personal computer, a microprocessor, analog circuitry, application specific integrated circuits, software for the same, and so on.

In the description provided herein, numerous specific details are set forth. However, it is understood that embodiments of the invention may be practiced without these specific details. In other instances, well-known methods, structures and techniques have not been shown in detail in order not to obscure an understanding of this description.

REFERENCES

[1] M. Andriluka, S. Roth, and B. Schiele. Pictorial structures revisited: People detection and articulated pose estimation. In CVPR, 2009.
[2] B. Babenko, P. Doll'ar, Z. Tu, and S. Belongie. Simultaneous learning and alignment: Multi-instance and multi-pose learning. In ECCV workshop on Faces in Real-Life Images, 2008.
[3] N. Dalal and B. Triggs. Histograms of oriented gradients for human detection. In CVPR, 2005.
[4] N. Dalal, B. Triggs, and C. Schmid. Human detection using oriented histograms of flow and appearance. In ECCV, 2006.
[5] P. Doll'ar, Z. Tu, P. Perona, and S. Belongie. Integral channel features. In BMVC, 2009.
[6] P. Doll'ar, C. Wojek, B. Schiele, and P. Perona. Pedestrian detection: A benchmark. In CVPR, 2009.
[7] M. Enzweiler and D. M. Gavrila. Monocular pedestrian detection: Survey and experiments. PAMI, 2009.
[8] A. Ess, B. Leibe, K. Schindler, and L. van Gool. A mobile vision system for robust multi-person tracking. In CVPR, 2008.
[9] M. Everingham, L. Van Gool, C. K. I. Williams, J. Winn, and A. Zisserman. The PASCAL Visual Object Classes Challenge 2008 (VOC2008) Results.
[10] P. Felzenszwalb, D. McAllester, and D. Ramanan. A discriminatively trained, multiscale, deformable part model. In CVPR, 2008.
[11] D. M. Gavrila and S. Munder. Multi-cue pedestrian detection and tracking from a moving vehicle. IJCV, 73:41-59, 2007.
[12] I. N. Junejo, E. Dexter, I. Laptev, and P. P'erez. Cross-view action recognition from temporal self-similarities. In ECCV, 2008.
[13] Z. Lin and L. S. Davis. A pose-invariant descriptor for human detection and segmentation. In ECCV, 2008.
[14] S. Maji, A. C. Berg, and J. Malik. Classification using intersection kernel support vector machines is efficient. In CVPR, 2008.
[15] P. Ott and M. Everingham. Implicit color segmentation features for pedestrian and object detection. In ICCV, 2009.
[16] C. Papageorgiou and T. Poggio. A trainable system for object detection. IJCV, 38(1):15-33, 2000.
[17] P. Sabzmeydani and G. Mori. Detecting pedestrians by learning shapelet features. In CVPR, 2007.

[18] W. Schwartz, A. Kembhavi, D. Harwood, and L. Davis. Human detection using partial least squares analysis. In ICCV, 2009.

[19] A. Shashua, Y. Gdalyahu, and G. Hayun. Pedestrian detection for driving assistance systems: Single-frame classification and system level performance. In IVS, 2004.

[20] E. Shechtman and M. Irani. Matching local self-similarities across images and videos. In CVPR, 2007.

[21] C. Stauffer and W. E. L. Grimson. Similarity templates for detection and recognition. In CVPR, 2001.

[22] K. E. A. van de Sande, T. Gevers, and C. G. M. Snoek. Evaluation of color descriptors for object and scene recognition. In PAMI, 2009. (in press).

[23] P. Viola, M. Jones, and D. Snow. Detecting pedestrians using patterns of motion and appearance. In ICCV, 2003.

[24] X. Wang, T. X. Han, and S. Yan. A HOG-LBP human detector with partial occlusion handling. In ICCV, 2009.

[25] T. Watanabe, S. Ito, and K. Yokoi. Co-occurrence histograms of oriented gradients for pedestrian detection. In PSIVT, 2009.

[26] M. Werlberger, W. Trobin, T. Pock, A. Wedel, D. Cremers, and H. Bischof. Anisotropic Huber-L1 optical flow. In BMVC, 2009.

[27] C. Wojek, S. Walk, and B. Schiele. Multi-cue onboard pedestrian detection. In CVPR, 2009.

[28] B. Wu and R. Nevatia. Detection and tracking of multiple, partially occluded humans by bayesian combination of edgelet part detectors. IJCV, 75(2):247-266, 2007.

[29] C. Zach, T. Pock, and H. Bischof. A duality based approach for realtime TV-L1 optical flow. In DAGM, 2007.

[30] Q. Zhu, M.-C. Yeh, K.-T. Cheng, and S. Avidan. Fast human detection using a cascade of histograms of oriented gradients. In CVPR, 2006.

Introduction to Some Issues Addressed by Some of the Embodiments

At least some embodiments of the present invention have a new feature based on self-similarity of low level features, in some particular embodiments color histograms from different sub-regions within the detector window. This feature, termed CSS, captures pairwise statistics of spatially localized color distributions, thus being independent of the actual color of a specific example. It is global similarities which are found, in the sense of similarities of a given sub-region with any other part of the detection window, not just the parts adjacent to the sub-region. The self-similarity enables representation of properties like "the color distributions on the left and right shoulder usually exhibit high similarity", independently of the actual color distribution, which may vary from person to person depending on their clothing. Adding CSS can improve state-of-the-art classification performance for both static images and image sequences. The new feature is particularly powerful for static images, and hence also valuable for applications such as content-based image retrieval. It also yields a consistent improvement on image sequences, in combination with motion detection in the form of optic flow.

Instance-specific color information was recently used in the form of implicit local segmentation features [15], encoding gradients of distances w.r.t. two local color distribution models ("foreground" and "background"). Only few authors have advocated the use of self-similarity as a feature.

Most notably, [20] encodes the local self-similarity of raw image patches in a log-polar binned descriptor. They demonstrate superior performance over gradient features in a template matching task, which can include matching particular human poses. In [12] the authors propose self-similarity descriptors over feature time series for human action recognition, observing good viewpoint invariance of the descriptor.

In a different context, [21] proposed a representation where color similarity is computed at the pixel level, assuming a Gaussian conditional color distribution.

Usually the choice of features is the most critical decision when designing a detector, and finding good features is still largely an empirical process with few theoretical guidelines. Different combinations of features were evaluated, including a new feature based on the similarity of colors in different regions of the detector window, which can significantly raise detection performance. The pedestrian region in one embodiment of our detection window is of size 48×96 pixels. As it has been shown to be beneficial to include some context around the person [3] the window itself is larger (64×128 pixels). HOG Histograms of oriented gradients are a known feature for object detection, first proposed in [3]. They collect gradient information in local cells into histograms using trilinear interpolation, and normalize overlapping blocks composed of neighbouring cells. Interpolation, local normalization and histogram binning make the representation robust to changes in lighting conditions and small variations in pose. HOG can optionally be enhanced by Local Binary Patterns (LBP) [24].

Figure 2:
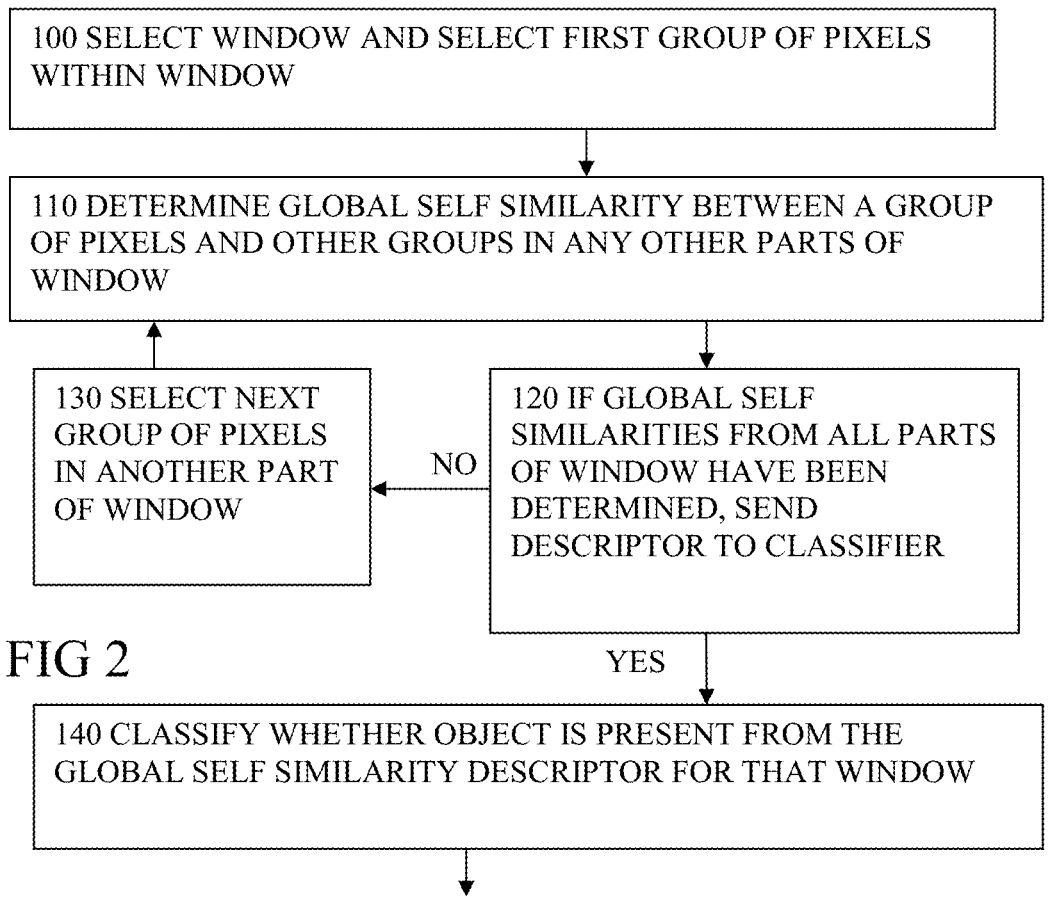
FIG. 2 shows method steps according to an embodiment.

FIGS. 1, 2 a First Embodiment

FIG. 1 shows an image processor according to an embodiment. FIG. 2 shows steps carried out by this or other embodiments. The image processor can be implemented as for example one or more integrated circuits having hardware such as circuit blocks dedicated to each of the parts shown, or can be implemented for example as software modules executed by a general purpose processor in sequence, as in a server. The parts shown include a selector 20 for receiving an input image or image stream (such as frames of a video, in real time or non real time) from an image source device 5, and selecting a detection window, and within that window, selecting groups of pixels to be processed. The groups can be e.g. 6×6 or 8×8 pixels or different sizes. They need not be square, and can be rectangular or other regular or irregular shape. Groups are processed by a global self similarity computation part 40. The self similarity computation part determines self similarity information for a group of the pixels in any part of the detection window, to represent an amount of self-similarity of that group to other groups in any other part of the detection window, and repeats the determination for groups in all parts of the detection window, to generate a global self similarity descriptor for the chosen detection window. Again this can be implemented in various ways, and an example will be described below in more detail with reference to FIG. 7.

The self similarity information for different parts of the window can be determined in parallel or sequentially and are fed to a classifier 50. This determines if the information corresponds to the object being sought. This can be a binary decision or can produce a score, and can be carried out in various ways, and an example is described in more detail below. There can be other parts to the image processor not shown in this figure, at any stage of the processor. A device 55 can be provided for interpreting or taking action based on the classifier score or decision. This can be for example a vehicle control system, or driver assistance system, a robotic system, a surveillance system for detecting intruders and so on.

FIG. 2 shows steps in operating the image processor of FIG. 1 or of other embodiments. At step 100, a window is selected, and a first group of pixels is selected. At step 110, self similarity information is determined for a group of the pixels in any part of the detection window, to represent an amount of self-similarity of that group to other groups in any other part of the detector window. At step 120, this is repeated for a next group, if the global self-similarities have not been processed for all parts of the window. Once it has been done for all parts of the detection window, to generate a global self similarity descriptor for the chosen detection window, this descriptor can be used by the classifier. At step 140, the classification of whether an object is present in the image is made from the descriptor.

Additional Features of Some Embodiments:

Additional features can include the self similarity information comprising an amount of self-similarity of colours of pixels of the group. This is one of several useful features which can help distinguish objects such as humans in particular. The image processor can have a part (42) arranged to determine a distribution of colours of the pixels of the groups, and the self similarity information comprising an amount of self-similarity of the colour distributions. This is another feature which can help distinguish objects such as humans in particular.

In some cases there is provided a part (30) for determining gradient information by determining a distribution of intensity gradients in a cell of pixels, and for inputting such gradient information for cells over all parts of the detection window to the classifier, the classifier additionally being arranged to use the gradient information to classify whether the object is present. The gradient information can be complementary to the self similarity information in many cases, and hence provide more distinctive information to the classifier to help enable better classification.

The image processor can have a part arranged to determine a flow of the groups in terms of motion vectors of the pixels of the groups over successive images in a sequence of images, and the self-similarity information comprising an amount of self-similarity of the flow. This is another feature which can help distinguish moving objects such as pedestrians.

The self-similarity computation part can have a histogram generator (44) arranged to determine a histogram of values for a feature of pixels in the group, by using interpolation. Such interpolation enables some data compression, to reduce computation load for subsequent steps, and enable faster or cheaper processing.

The self similarity computation part can have a part (46) arranged to determine similarities between histograms for different groups of pixels in the detection window by a histogram intersection. Histogram intersection is one of a number of ways of determining similarities and proves to be particularly efficient and effective.

The image processor can comprise a motion detection part (70) for detecting motion vectors for parts of the image, and the classifier part being arranged to classify based also on the motion vectors of parts in the detection window. Such motion information is also useful to distinguish humans in some situations and is often complementary to the self similarity information.

The image processor can have a combiner part (60) for combining the similarity information and the distributions of intensity gradients before input to the classifier. Although in principle the classifier could operate on the information separately, it is usually more efficient to combine the information first.

Figure 3:
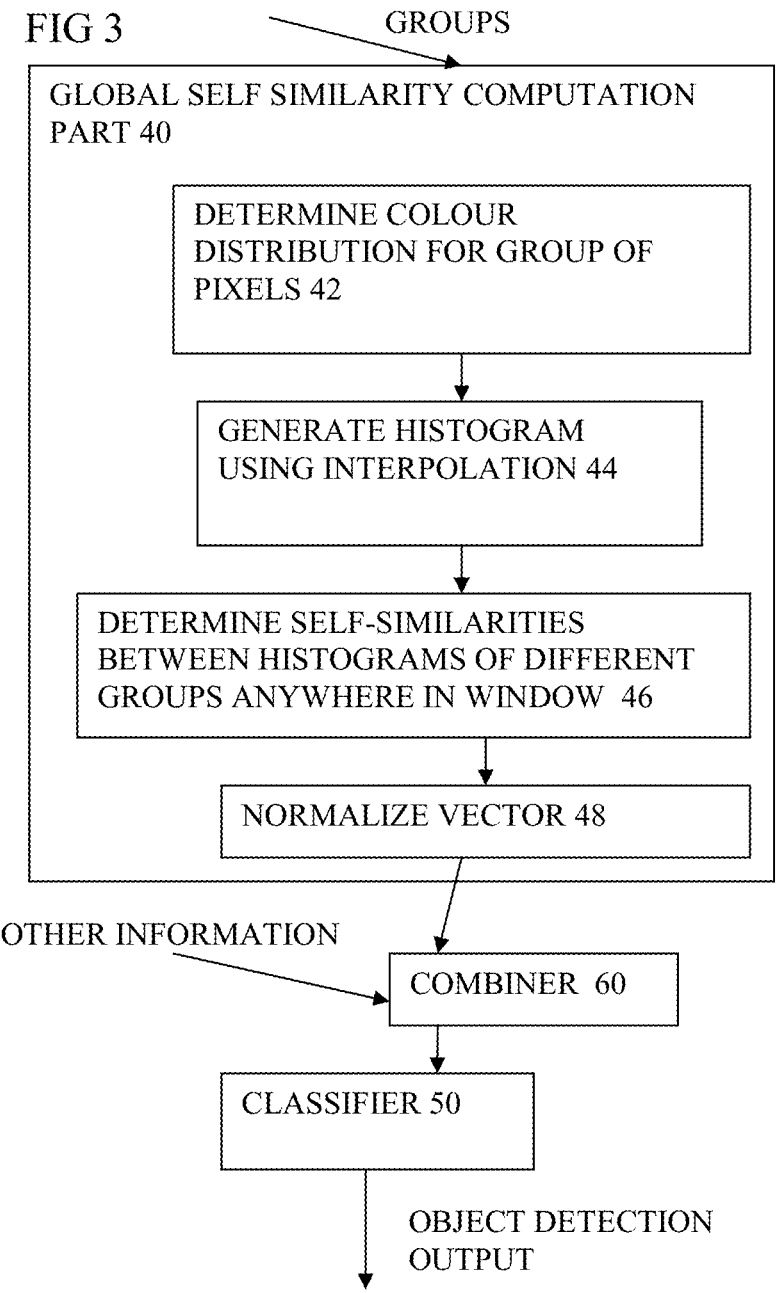
FIG. 3 shows another embodiment.

FIG. 3, Embodiment of Global Self Similarity Computation Part

FIG. 3 shows an embodiment similar to that of FIG. 1, but showing more details of one way to implement part 40, for computing the global self-similarity information, showing some of the functions it can carry out. Other ways can be envisaged. In this case, the feature for the self similarity information is colour distribution, so there is shown a step of determining colour distribution for a group of pixels 42. At step 44 a histogram is generated, optionally using interpolation 44 to reduce the amount of data and reduce aliasing effects. The histograms for different groups are typically stored and retrieved as needed by a step 46 of determining the similarity between the histogram of a given group and other groups anywhere in the detection window. If all histograms are compared to all others, then the result can be a large number of similarity values, which can be regarded as a multidimensional matrix or vector, having as many dimensions as there are pairs of groups (that is $G*(G-1)/2$) where G is the number of groups. The groups can be adjacent or overlapping, or spread apart, but should be chosen from different parts of the window so that the self-similarities are global within the window, and not local in the sense of being only relative to other groups adjacent to the group being considered. This can lead to a normalizing step 48 for normalizing the output vector to account for conditions such as camera noise/image artifacts/different amounts of clutter, or any other causes of some images having overall a lower "self-similarity" for example. A combiner 60 can be provided for combining the self-similarity information with other information such as gradient information. This implies there is a compatible data format for both, so the gradient information can be in the form of a vector which can be stacked with the vector of self similarity information, for input to the classifier.

Then the combined data can be fed to the classifier 50 for the decision or scoring of whether the object has been detected. This can be repeated for other detection windows within the image. The other windows can be chosen for example by sliding, by zooming to alter the scale, or by seeking areas of interest, using known algorithms which need not be described here.

Figure 4:
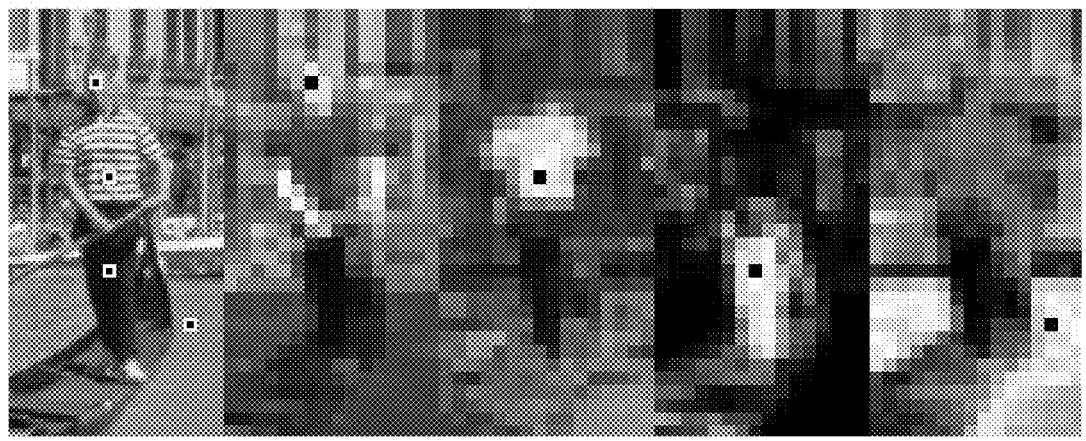
FIG. 4 shows views of a window of an image and self similarity information from four cells in different parts of the image.

FIG. 4 Views of Self Similarity Information

FIG. 4 shows an example detection window within an image on the left hand side and shows on its right, four different views of self similarity information determined for four particular points in this example. The self similarity information is computed at marked cell positions using HSV+histogram intersection methods as discussed in more detail below. Cells with higher similarity are brighter. Of the four self similarity views, the first on the left represents a colour similarity of every other group of pixels with a group located at the head of the human in the image. The second view is the colour similarity of every other group of pixels with a group located at the stomach of the human in the image. The third view is the colour similarity of every other group of pixels with a group located at an upper leg region of the human in the image. The fourth view is the colour similarity of every other group of pixels with a group located off the human, at a point showing water in the background in the image. Note how self-similarity highlights and distinguishes relevant parts like clothing and visible skin regions.

Figure 5:
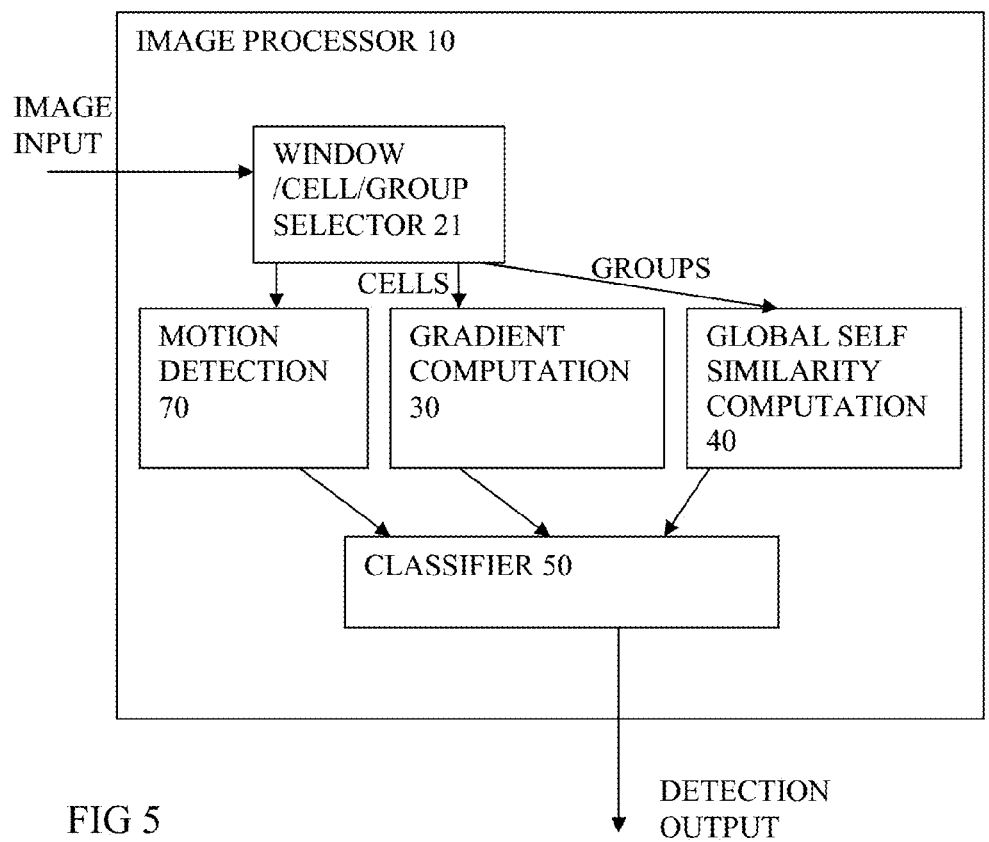
FIG. 5 shows an image processor according to an embodiment having a motion detector.

FIG. 5, Embodiment with Motion Detection

FIG. 5 shows an embodiment similar to that of FIG. 1. A window/cell/group selector part 21 selects a detection window within an image, and within that window, selects groups or cells of pixels. The window selection can be by sliding, scaling, or finding an area of interest for example. The cells and groups can be the same size, e.g. 6×6 or 8×8 pixels or different sizes. They need not be square, and can be rectangular or other regular or irregular shape. Cells are fed to the gradient computation part 30. Groups are sent to the self similarity computation part 40. Groups and cells are so named to show that different pixels can be sent to different parts for processing, though in principle the same cells could be sent to both parts shown.

The gradient computation part determines gradient information such as a steepness of the gradient of intensity, and an orientation for that cell. This can be intensity of brightness or intensity of colours for example. Various algorithms can be used to implement this part, an example is described in more detail below. The global self similarity computation part determines self similarity information for the group, relative to any other parts of the window. Again this can be implemented in various ways, and an example will be described below in more detail with reference to FIG. 7.

The gradient information and the self similarity information can be determined in parallel or sequentially and are both fed to a classifier 50.

In this case a motion detector part 70 can be added, which can determine motion information such as optic flow for a given cell or group, based on frames (preferably consecutive frames). This can be implemented in various ways following established practice, and so will not be described in more detail here. A possible enhancement to this part is described below.

Figure 6:
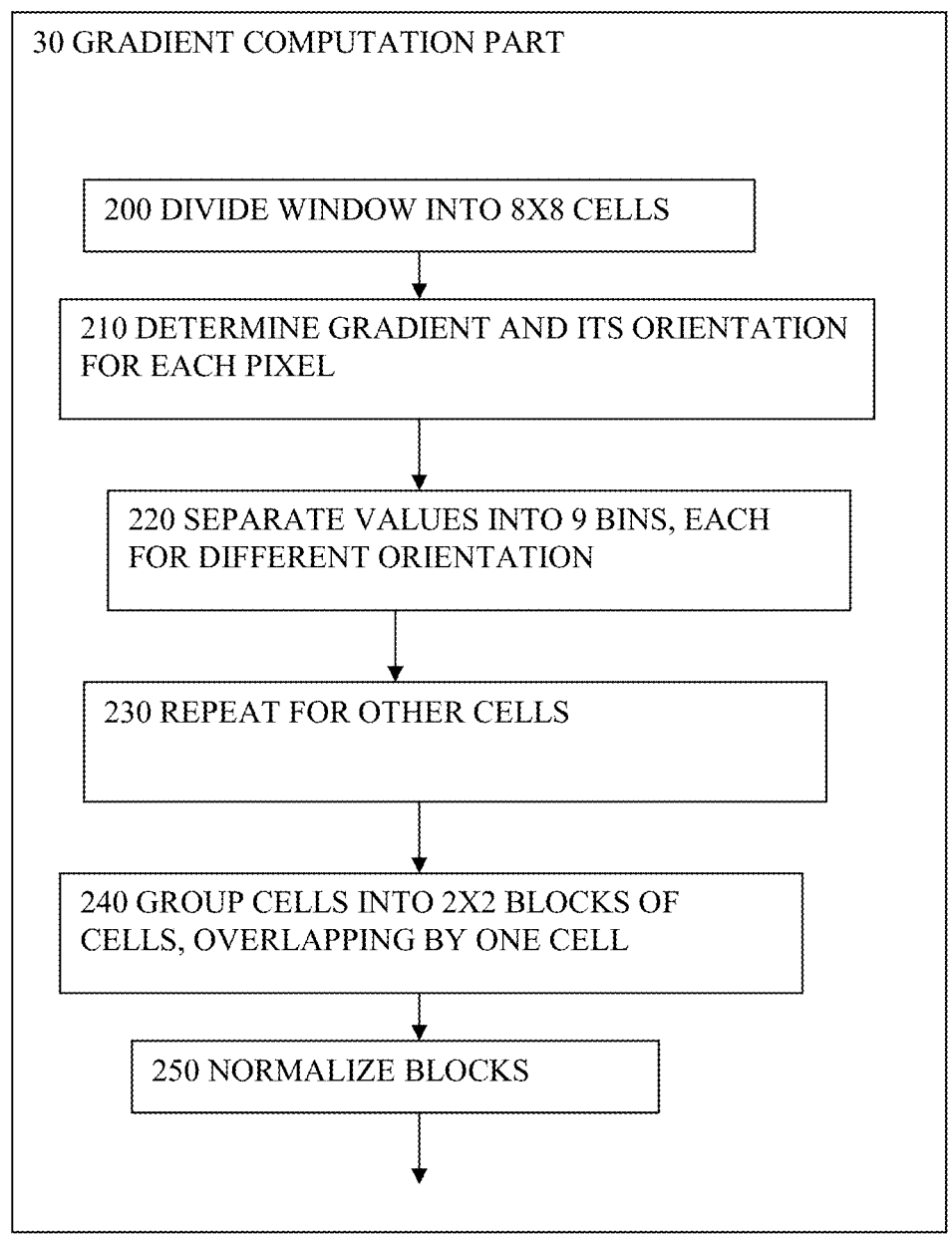
FIG. 6 shows steps in determining gradient information according to an embodiment.

FIG. 6, Steps in Determining Gradient Information

In FIG. 6, steps are shown for one way to implement the gradient computation part 30 for determining gradient information in the form of distribution of intensity gradients in each cell. At step 200, a window is divided into cells of 8×8 pixels. At step 210, a gradient value for that cell is determined and the orientation of the gradient is determined, from the 64 pixel values, of intensity or colour values as appropriate. At step 220, these values are separated into 9 bins, one for each of the different orientations. At step 230, these steps are repeated for other cells, and the bins for different cells are grouped into 2×2 blocks of cells, overlapping by one cell for example. Normalization at step 250 is carried out on a block basis. Other ways of implementation can be envisaged.

Figure 7:
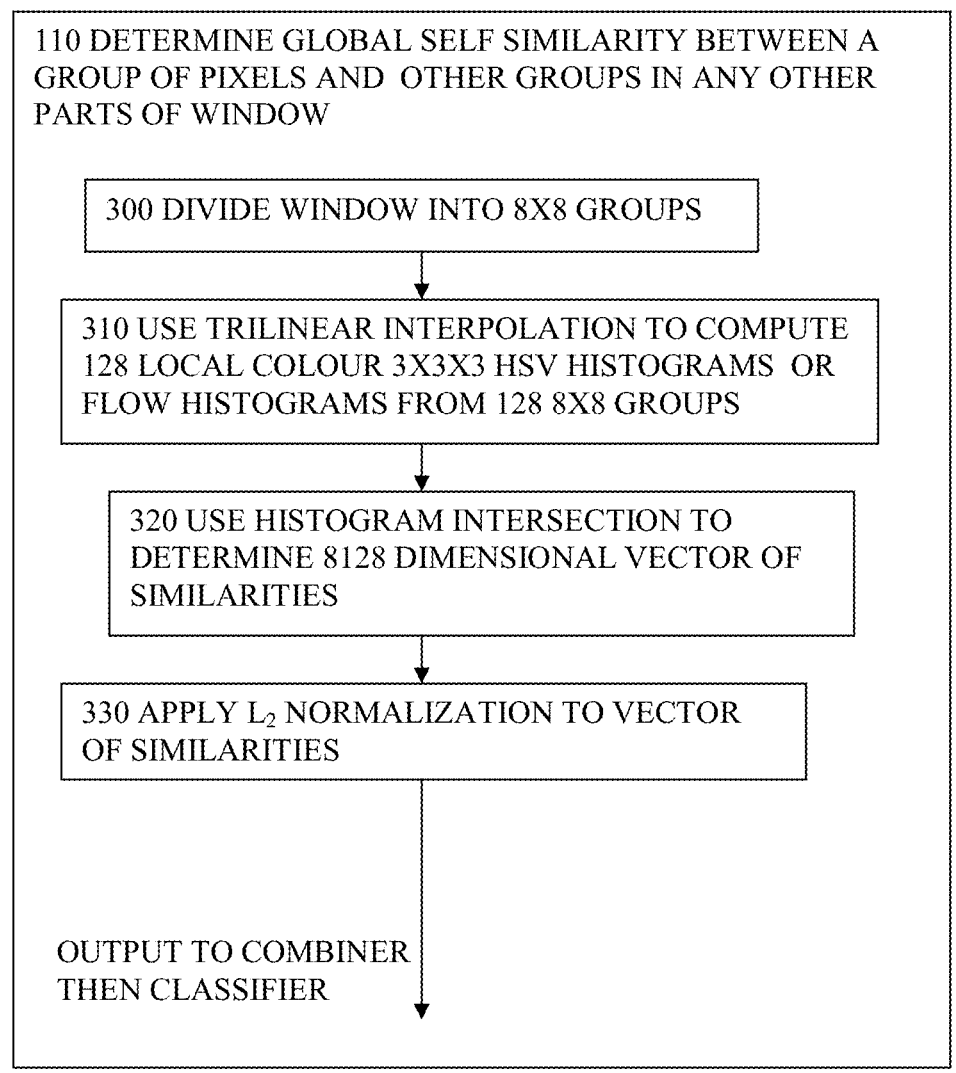
FIG. 7 shows steps in determining self similarity information according to an embodiment.

FIG. 7, Steps in Determining Global Self Similarity Information

In FIG. 7 steps are shown for one way to implement the step 110 of determining global self similarity information. At step 300, the window is divided into 8×8 groups of pixels. At step 310, trilinear interpolation is used to compute 128 local colour histograms from 128 8×8 groups of pixels, and/or flow histograms as appropriate. Colour is represented in the well known HSV format, though other colour representations could be used. Flow can be represented as motion vectors. At step 320, pairs of these histograms are compared to determine a value for similarity. The histogram intersection method is used though other methods could be used. If all 128 are compared to all others, this results in a 8128 dimensional vector of similarity values. At step 330, L2 normalization is applied to this vector. Results in the form of normalized vectors are output to the combiner or classifier.

Figure 8:
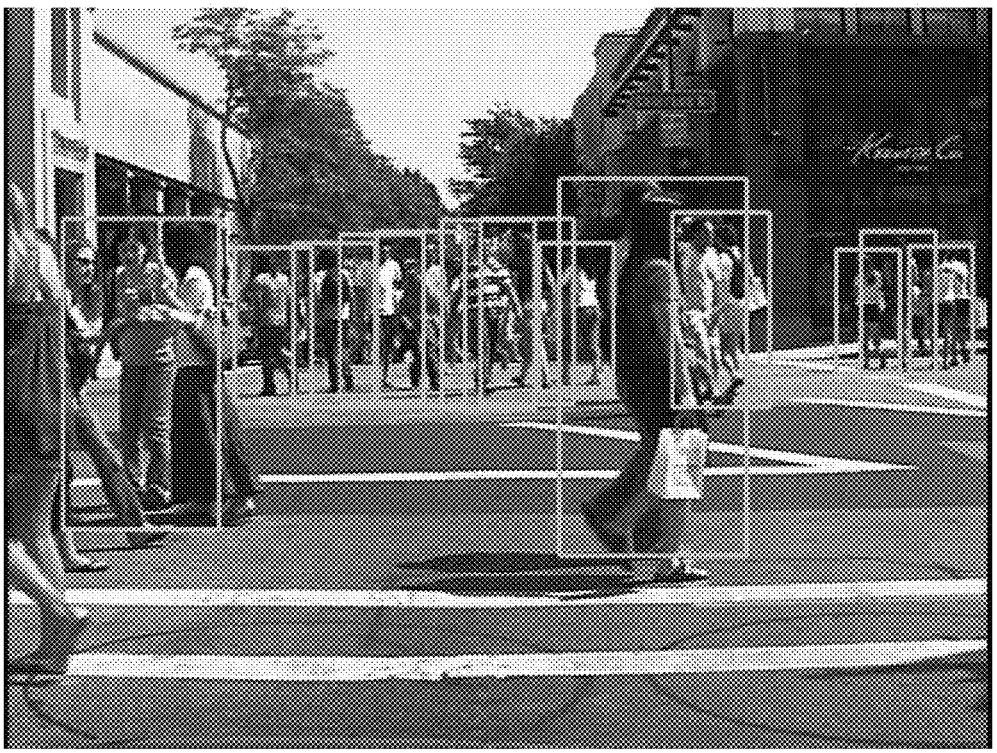
FIG. 8 shows an example of an image showing detection windows.

FIG. 8 Example of Image Showing Detection Windows

This figure shows an example of an image containing many objects, some of which are humans, and some are overlapping with others giving rise to occlusions. Detection windows around each possible human are shown. These may be selected based on sliding a window over the image and comparing scores of different windows, and windows at different scales.

Figure 9:
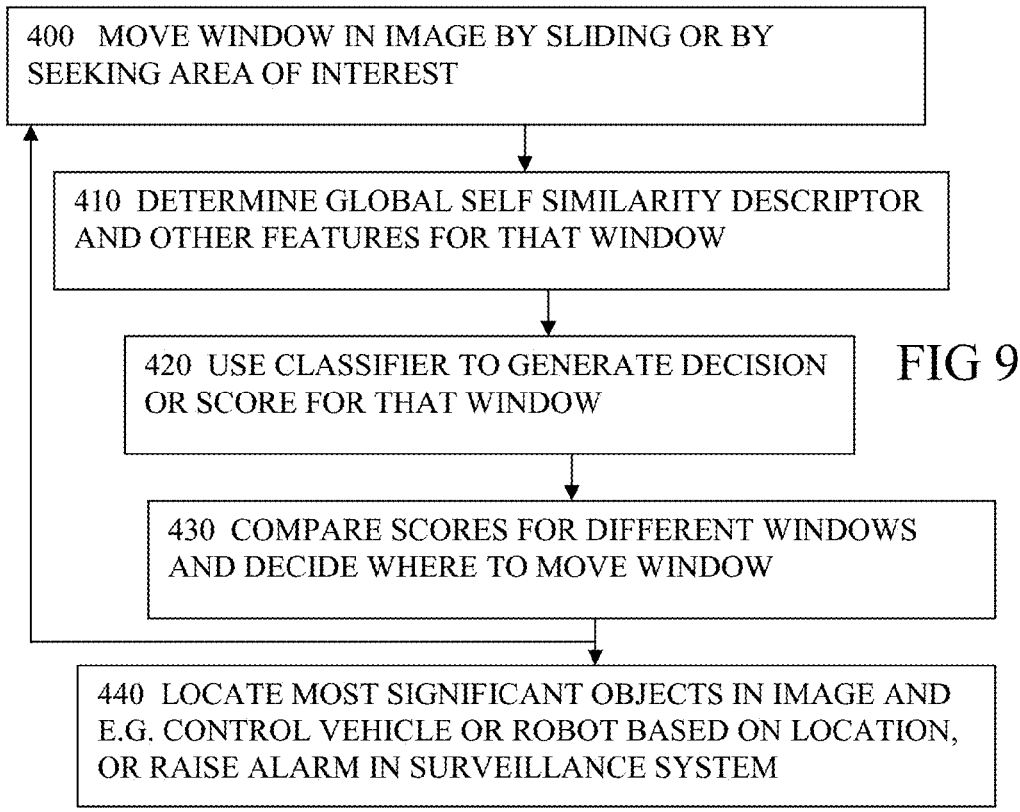
FIG. 9 shows steps according to another embodiment.

FIG. 9, Steps in Another Embodiment.

In FIG. 9, at step 400, a window is moved over an image, by sliding, scaling or seeking an area of interest. At step 410, a global self-similarity descriptor and optionally other features are obtained for that window. At step 420 a classifier is used to generate a score or a decision for each window. At step 430, scores for different windows are compared, and this may be used to decide where to move and/or scale the window. This may lead to repeating steps 400 to 430. At any time, step 440 may be carried out, using the scores for different windows to locate an object and take action based on the scores and the location, such as to control a vehicle or robot, or raise an alarm in a surveillance system for example.

Practical Considerations for HOG/HOF

In experiments histograms were computed with 9 bins on cells of 8×8 pixels. Blocksize was 2×2 cells overlapping by one cellsize. HOF Histograms of flow were initially also proposed by Dalal et al. [4]. We determined that using them (e.g. in [4]'s IMHwd scheme) complementary to HOG can give substantial improvements on realistic datasets with significant motion of the humans. In some embodiments of the present invention a lower-dimensional variant of HOF, IMHd2 is introduced. This encodes motion differences within 2×2 blocks with 4 histograms per block, while matching the performance of IMHwd (3×3 blocks with 9 histograms). The new coding scheme can be explained as follows:

The 4 squares display the encoding for one histogram each. For the first histogram, the optical flow corresponding to the pixel at the ith row and jth column of the upper left cell is subtracted from the one at the corresponding position of the lower left cell, and the resulting vector votes into a histogram as in the original HOF scheme. IMHd2 provides a dimensionality reduction of 44% (2520 instead of 4536 values per window), without changing performance significantly.

We used the publicly available flow implementation of [26]. HOF continues to provide a substantial improvement even for flow fields computed on JPEG images with strong block artifacts (and hence degraded flow fields).

Several authors have reported improvements by combining multiple types of low-level features [5, 18, 27]. Still, it is largely unclear which cues could be used in addition to the known combination of gradients and optic flow, as there are many different aspects to the image statistics. Color information is such a feature enjoying popularity in image classification [22] but is nevertheless rarely used in detection. Furthermore, second order image statistics, especially co-occurrence histograms, are gaining popularity, pushing feature spaces to extremely high dimensions [25, 18].

CSS

Embodiments of the present invention can combine two of these ideas and use second order statistics of colors for example as an additional feature. Color by itself is of limited use, because colors vary across the entire spectrum both for people (respectively their clothing) and for the background, and because of the essentially unsolved color constancy problem. However, people do exhibit some structure, in that colors are locally similar—for example (see FIG. 4) the skin color of a specific person is similar on their two arms and face, and the same is true for most people's clothing. Therefore, we encode color self-similarities within the descriptor window, i.e. similarities between colors in different sub-regions. To leverage the robustness of local histograms, we compute D local color histograms over 8×8 pixel blocks, using trilinear interpolation as in HOG to minimize aliasing. We experimented with different color spaces, including 3×3×3 histograms in RGB, HSV, HLS and CIE Luv space, and 4×4 histograms in normalized rg, HS and uv, discarding the intensity and only keeping the chrominance. Among these, HSV worked best, and is used in the following.

The histograms form the base features between which pairwise similarities are computed. Again there are many possibilities to define similarity between histograms. We experimented with a number of well-known distance functions including the L1-norm, L2-norm, $X^2$-distance, and histogram intersection. We used histogram intersection as it worked best. Finally, we applied L2-normalization to the (D·(D−1)/2)-dimensional vector of similarities. In our implementation with D=128 blocks, CSS has 8128 dimensions. Normalization proved to have a considerable effect in combination with SVM classifiers. Note that CSS circumvents the color-constancy problem by only comparing colors locally. In computation cost, CSS is on the same order of magnitude as HOF.

Self-similarity of colors is more appropriate than using the underlying color histograms directly as features. CSS in HSV space yields a noticeable improvement. On the contrary adding the color histogram values directly even hurts the performance of HOG.

In an ideal world this behavior should not occur, since SVM training would discard un-informative features. Unfortunately this holds only if the feature statistics are identical in the training and test sets. In our setup—and in fact quite often in practice—this is not the case: the training data was recorded with a different camera and in different lighting conditions than the test data, so that the weights learned for color do not generalize from one to the other. A similar observation was made by [27], in which the author found that adding Haar features can sometimes help, but careful normalization is required, if the imaging conditions vary. Note that [5] shows successfully utilizing (raw) color, and so embodiments can be envisaged in which it is incorporated as a factor in the classifier of the detector (e.g. skin color may in principle be a sensible cue).

Note that self-similarity is not limited to color histograms and directly generalizes to arbitrary localized subfeatures within the detector window. We experimented with self-similarity on features such as gradient orientation in the form of HOG blocks or motion detection features such as flow histograms.

Classifiers:

Linear SVMs remain a popular choice for people detection because of their good performance and speed. Nonlinear kernels typically bring some improvement, but commonly the time required to classify an example is linear in the number of support vectors, which is intractable in practice. An exception is the (histogram) intersection kernel (HIK) [14], which can be computed exactly in logarithmic time, or approximately in constant time, while consistently outperforming the linear kernel.

Viola et al. [23] used AdaBoost in their work on pedestrian detection. However, it has since been shown that AdaBoost does not perform well on challenging datasets with multiple viewpoints [27]. MPLBoost remedies some of the problems by learning multiple (strong) classifiers in parallel. The final score is then the maximum score over all classifiers, allowing individual classifiers to focus on specific regions of the feature space without degrading the overall classification performance.

Discussion of Results

Results obtained with different variants of our detector will now be discussed. On Caltech Pedestrians, we used the evaluation script provided with the dataset. For TUD-Brussels we evaluated on the full image, including pedestrians at the image borders (in contrast to [27]), who are particularly important for practical applications—e.g. for automotive safety, near people in the visual periphery are the most critical ones. Unless noted otherwise, the classifier used with our detector is HIKSVM.

Performance was measured on the "reasonable" subset of Caltech Pedestrians, which is the most popular portion of the data. It consists of pedestrians of ≥50 pixels in height, who are fully visible or less than 35% occluded. Our detector in its strongest incarnation, using HOG, HOF and CSS in a HIKSVM (HOGF+CSS), outperforms the previous top performers—the channel features (ChnFtrs) of [5] and the latent SVM (LatSvm−V2) of [10]—by a large margin: 10.9% at 0.01 fppi, 14.7% at 0.1 fppi and 7.0% at 1 fppi. We also note that our baseline, HOG with HIKSVM, is on par with the state of the art [5, 10], which illustrates the effect of correct bootstrapping, and the importance of careful implementation. We did not tune our detector to the dataset. Still, to make sure the performance gain is not dataset-specific, we have verified that our detector outperforms the original HOG implementation [3] also on INRIAPerson (also note that adding CSS provides an improvement for HOG+LBP). HOG+CSS is consistently better than HOG alone, providing an improvement of 5.9% at 0.1 fppi, which indicates that color self-similarity is indeed complementary to gradient information. HOG+HOF improves even more over HOG, especially for low false positive rates: at 0.1 fppi the improvement is 10.9%. This confirms previous results on the power of motion as a detection cue. Finally, HOG+HOF+CSS is better than only HOG+HOF, showing that CSS also contains information complementary to the flow, and achieves our best result of 44.35% recall at 0.1 fppi.

The performance on the "near" subset (80 pixels or taller) showed that again, our baseline (HOG(our)) is at least on par with the state of the art [5, 10]. HOG+CSS provided better performance between 0.01 and 0.5 fppi, 6% at 0.1 fppi. Adding HOF to HOG (HOGF) added 19.9% recall at 0.01 fppi. At 0.1 fppi it beat the closest competitor HOG+CSS by 11% and the best published result (LatSvm−V2) by 21.2%. Adding CSS brought another small improvement for large pedestrians. The reason that HOF works so well on the "near" scale is probably that during multiscale flow estimation compression artifacts are less visible at higher pyramid levels, so that the flow field is more accurate for larger people.

Evaluation was also carried out for increasing occlusion levels. Results for the "no occlusion" subset, were almost identical to a subset where only approximately 5% of the "reasonable" pedestrians are partially occluded. Plots are also stretched vertically to provide for better readability. Evaluated on the partially occluded pedestrians alone (which is not a significant statistic, because there are only about 100 such examples), latent SVM and channel features slightly outperform our HOG, but again are dominated by HOG+HOF, with CSS again bringing a further small improvement. On the heavily occluded pedestrians the performance of all evaluated algorithms is abysmal. A lack of robustness to heavy occlusion is a well-known issue for global detectors. Still, there is a noticeable relative improvement with our detector: At 0.1 fppi, the recall of HOG+HOF+CSS is at 7.8% compared to 3.9% for ChnFtrs, doubling the recall. At 1 fppi, our full detector still performs best, with 5.9% higher recall than LatSvm–V2. That colour self-similarity helps in the presence of occlusion may seem counter-intuitive at first, because occlusion of a local sub-region is likely to affect its similarity to all other sub-regions. However, in the case of Caltech, "heavy occlusion" mostly means that the lower part of the body is occluded, so that similarities between different parts of the upper body can still be used.

An improvement was gained by adding CSS on the TUD-Brussels dataset. CSS adds little in the high precision regime, but starting at 0.05 fppi there is a notable boost in performance, as recall is improved by 2.7% at 0.1 fppi and 4.2% at 1 fppi. For static images with no flow information, the improvement starts earlier, reaching 3.6% at 0.1 fppi and 5.4% at 1 fppi.

If the results of [27] on TUDBrussels are compared, in this paper Haar features did provide an improvement only on that dataset, on others they often cost performance. This is in contrast to CSS, which so far have produced consistent improvements, even on datasets with very different image quality and colour statistics. Judging from the available research, Haar features can potentially harm more than they help.

For the static image setting, HOG+CSS consistently outperformed the results of [27] by 5%-8% against HOG+Haar with MPLBoost, and by 7%-8% against HOG with HIKSVM. Utilizing motion, the detector of [27] using HOG+HOF (in the IMHwd scheme), Haar features and a linear SVM is on par with HOG+HOF+CSS for low false positive rates, but it starts to fall back at 0.2 fppi. The result of [27] using HOG+HOF with HIKSVM is consistently worse by 3%-5% than HOG+HOF+CSS, especially at low false positive rates. We have in all cases used the tools and detections used in the original publications [6, 27] for the respective datasets.

One evaluation was on the "far" subset of the Caltech dataset. In this setting, only pedestrians with an annotated height 20 to 30 pixels were considered. Detections fulfilling the Pascal condition can be as small as 10 pixels or as large as 59 pixels. Any annotation inside the 20-30 pixel range can be matched by a detection outside the range. This introduces an asymmetry which is difficult to handle. The Caltech evaluation script discards all detections outside the considered range, resulting in situations where a pedestrian with an annotated height of 29 pixels and a detected height of 30 pixels counts as a missed detection, although I/U>90%. This is clearly undesirable, especially if many annotations are close to the size limit (which is always the case for small size ranges). However, trying to fix this bias introduces other ones. One possibility is to establish correspondence with the full sets of annotation and detection, and prune for size afterwards.

Computer Implementations

Some of the method steps discussed above for determining a distribution density or determining self-similarity information, or detecting a human in the image for example, may be implemented by logic in the form of hardware or, for example, in software using a processing engine such as a microprocessor or a programmable logic device (PLD's) such as a PLA (programmable logic array), PAL (programmable array logic), FPGA (field programmable gate array).

An example of a circuit with an embedded processor will be described for use in applications such as vehicle control or driver assistance or monitoring of surveillance cameras. This circuit may be constructed as a VLSI chip around an embedded microprocessor such as an ARM7TDMI core designed by ARM Ltd., UK which may be synthesized onto a single chip with the other components shown. Alternatively other suitable processors may be used and these need not be embedded, e.g. a Pentium processor as supplied by Intel Corp. USA. A zero wait state SRAM memory may be provided on-chip as well as a cache memory for example. Typically I/O (input/output) interfaces are provided for receiving and transmitting data to relevant networks, e.g. wireless or cable networks. FIFO buffers may be used to decouple the processor from data transfer through these interfaces. The interface can provide network connections, i.e. suitable ports and network addresses, e.g. the interfaces may be in the form of network cards.

Software programs may be stored in an internal ROM (read only memory) and/or on any other non-volatile memory, e.g. they may be stored in an external memory. Access to an external memory may be provided an external bus interface if needed, with address, data and control busses. The method and apparatus of the embodiments described may be implemented as software to run on a processor. In particular an image processor in accordance with the present invention may be implemented by suitable programming of a processor. The methods and procedures described above may be written as computer programs in a suitable computer language such as C and then compiled for the specific processor in the embedded design. For example, for the embedded ARM core VLSI described above the software may be written in C and then compiled using the ARM C compiler and the ARM assembler. The software has code, which when executed on a processing engine provides the methods and the apparatus of the present invention. The software programs may be stored on any suitable machine readable medium such as magnetic disks, diskettes, solid state memory, tape memory, optical disks such as CD-ROM or DVD-ROM, etc.

In conclusion, as described, an image processor (10) has a window selector for choosing a detection window within the image, and a self similarity computation part (40) for determining self-similarity information for a group of the pixels in any part of the detection window, to represent an amount of self-similarity of that group to other groups in any other part of the detector window, and for repeating the determination for groups in all parts of the detection window, to generate a global self similarity descriptor for the detection window. A classifier (50) is used for classifying whether an object is present based on the global self-similarity descriptor. By using global self-similarity rather than local similarities more information is captured which can lead to better classification. In particular, it helps enable recognition of more distant self-similarities inherent in the object, and self-similarities present at any scale. Other variations can be envisaged within the scope of the claims.

The invention claimed is:

1. An image processor for detection of an object in an image or sequence of images, each image being formed of pixels, and the image processor comprising:

a window selector for choosing a detection window within the image, a self-similarity computation part configured to determine similarity information for a group of the pixels in any part of the detection window, to represent an amount of self-similarity of that group to other groups in every other part of the detection window, and for repeating the determination for groups in all parts of the detection window, to generate a global self-similarity descriptor for the chosen detection window, wherein the self-similarity computation part is configured to determine a plurality of similarity values, each similarity value being based on a comparison of self-similarity information for a first group of the pixels with a second group of the pixels, and wherein the plurality of similarity values are comprised in the global self-similarity descriptor;

a classifier configured to classify whether the object is present in the detection window of the image from the global self-similarity descriptor for that detection window; and a color distribution part arranged to determine a distribution of colors of the pixels of the groups, wherein the self-similarity information comprises an amount of self-similarity of the color distributions, and wherein the self-similarity computation part comprises:
  a histogram generator arranged to determine a histogram of values for a feature of pixels in the group, by using interpolation; and
  a histogram similarity part arranged to determine similarities between histograms for different groups of pixels in the detection window by a histogram intersection.

2. The image processor of claim 1, wherein the self-similarity information further comprises an amount of self-similarity of colors of pixels of the group.

3. The image processor of claim 1, further comprising a gradient information determination part for determining gradient information by determining a distribution of intensity gradients in a cell of pixels, and inputting such gradient information for cells over all parts of the detection window to the classifier,
  wherein the classifier is further configured to use the gradient information to classify whether the object is present.

4. The image processor of claim 3, further comprising a combiner part for combining the self-similarity information and the distribution of intensity gradients before input to the classifier.

5. The image processor of claim 1, further comprising a flow determination part arranged to determine a flow of the groups in terms of motion vectors of the pixels of the groups over successive images in a sequence of images, and
  wherein the self-similarity information further comprises an amount of self-similarity of the flow.

6. The image processor of claim 1, further comprising a motion detection part for detecting motion vectors for parts of the image,
  wherein the classifier is further configured to classify based on the motion vectors of parts in the detection window.

7. A method of using an image processor for detection of an object in an image or sequence of images, each image being formed of pixels, and the method having the steps of:
  choosing a detection window within the image,
  determining self-similarity information for a group of the pixels in every part of the detection window, to represent an amount of self-similarity of that group to other groups in every other part of the detection window;
  comparing self-similarity information for a first group of pixels to self-similarity information of a second group of pixels to determine a similarity value based on a result of the comparing;
  repeating the determination and comparing for groups in all parts of the detection window, to generate a global self-similarity descriptor for the chosen detection window including the determined similarity values;
  classifying whether the object is present in the detection window of the image from the global self-similarity descriptor for that detection window; and
  determining a distribution of colors of the pixels of the groups,
  wherein the self-similarity information comprises an amount of self-similarity of the color distributions, and
  wherein the determining comprises:
    determining a histogram of values for a feature of pixels in the group, by using interpolation; and
    determining similarities between histograms for different groups of pixels in the detection window by a histogram intersection.

8. The method of claim 7, further comprising determining gradient information by determining a distribution of intensity gradients in a cell of pixels, and determining such gradient information for cells over all parts of the detection window,
  wherein the classifying comprises using the gradient information to classify whether the object is present.

9. The method of claim 7, further comprising determining a flow of the groups in terms of motion vectors of the pixels of the groups over successive images in a sequence of images,
  wherein the self-similarity information further comprises an amount of self-similarity of the flow.

10. A non-transitory computer-readable medium having embodied thereon computer-executable instructions which when executed by a computer cause the computer to carry out the method of claim 7.

11. An integrated circuit having the image processor of claim 1.

* * * * *